US010951866B2

(12) United States Patent
Yamashita

(10) Patent No.: US 10,951,866 B2
(45) Date of Patent: Mar. 16, 2021

(54) IMAGE SENSOR DEVICE HAVING COLOR FILTER ARRAYS AND IMAGE PROCESSING METHOD THEREOF

(71) Applicant: TAIWAN SEMICONDUCTOR MANUFACTURING COMPANY LTD., Hsinchu (TW)

(72) Inventor: Yuichiro Yamashita, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 60 days.

(21) Appl. No.: 15/651,534

(22) Filed: Jul. 17, 2017

(65) Prior Publication Data

US 2019/0020857 A1 Jan. 17, 2019

(51) Int. Cl.
*H04N 9/04* (2006.01)
*H04N 9/07* (2006.01)
*H04N 9/64* (2006.01)

(52) U.S. Cl.
CPC ......... *H04N 9/045* (2013.01); *H04N 9/04515* (2018.08); *H04N 9/04557* (2018.08); *H04N 9/07* (2013.01); *H04N 9/646* (2013.01)

(58) Field of Classification Search
CPC .......... H04N 9/045; H04N 9/07; H04N 9/646; H04N 9/04557; H04N 9/04515; G06T 3/4015
See application file for complete search history.

(56) References Cited

U.S. PATENT DOCUMENTS

| 6,999,119 B1* | 2/2006 | Shibazaki | H04N 9/045 348/230.1 |
| 2014/0204249 A1* | 7/2014 | Okigawa | H01L 27/14621 348/280 |
| 2016/0286108 A1* | 9/2016 | Fettig | H04N 5/2355 |

OTHER PUBLICATIONS

Leo Anzagira; Eric R. Fossum, Color Filter Array Patterns Designed to Mitigate Crosstalk Effects in Small Pixel Image Sensors, Journal of the Optical Society of America A, Jan. 2015, vol. 32(1), pp. 28-34.

(Continued)

*Primary Examiner* — Nicholas G Giles
(74) *Attorney, Agent, or Firm* — WPAT, P.C., Intellectual Property Attorneys; Anthony King

(57) ABSTRACT

An image sensor device includes a plurality of color filter units arranged in an array, each of the color filter units comprising an array of n*m color filters, and n and m are integers equal to or greater than 3. The plurality of color filter units includes a plurality of first color filter units, a plurality of second color filter units, and a plurality of third color filter units. The color filters of the first color filter units are transmissive to light beams within a first wavelength range, the color filters of the second color filter units are transmissive to light beams within a second wavelength range, and the color filters of the third color filter units are transmissive to light beams within a third wavelength range.

20 Claims, 11 Drawing Sheets

(56) References Cited

OTHER PUBLICATIONS

Biay-Cheng Hseih; Hasib Siddiqui; Jiafu Luo; Todor Georgiev; Kalin Atanassov; Sergio Goma; Hy Cheng; Jj Sze; Rj Lin; Ky Chou; Calvin Chao; Sg Wuu, New Color Filter Patterns and Demosaic for Sub-micron Pixel Arrays, 2015 International Image Sensor Workshop (IISW).

Tomomasa Gotoh; Masatoshi Okutomi, Color Super-Resolution from a Single CCD, Proc. IEEE Workshop on color and photometric methods, 2003, 2003.

Mark B. Cannell; Angus McMorland; Christian Soeller, Image Enhancement by Deconvolution, Handbook of biological confocal microscopy, 2006, 488-500.

* cited by examiner

IMAGE SENSOR DEVICE HAVING COLOR FILTER ARRAYS AND IMAGE PROCESSING METHOD THEREOF

BACKGROUND

Solid state image sensors are necessary components in many optoelectronic devices, including digital cameras, cellular phones, and others. Conventional solid-state image sensors for color analog or digital video cameras include typically charge-coupled devices (CCD) or complementary metal oxide semiconductor (CMOS) photodiode array structures which include a spectrally photosensitive layer below one or more layers patterned in an array of color filters and above which resides a surface-layer array of micro-lens elements. The elementary unit of the image sensor is defined as a pixel. The basic technology used to form the CMOS image sensor is common to both sensor types.

The CMOS image sensor includes a photo detector detecting light and a logic circuit converting the detected light into an electric signal representing data regarding the detected light. For the image sensor to detect and provide a color image, it typically must employ both the photo detectors receiving the lights and generating and accumulating charge carriers and a color filter array (CFA), i.e., a plurality of color filter units sequentially arranged above the photo detector. The CFA typically uses one of two alternative three-color primary configurations, either red R, green G and blue B (RGB) configuration or one of yellow Y, magenta M and cyan C (CMY). And a plurality of micro-lenses is positioned above the CFA to increase the photo-sensitivity of the image sensor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
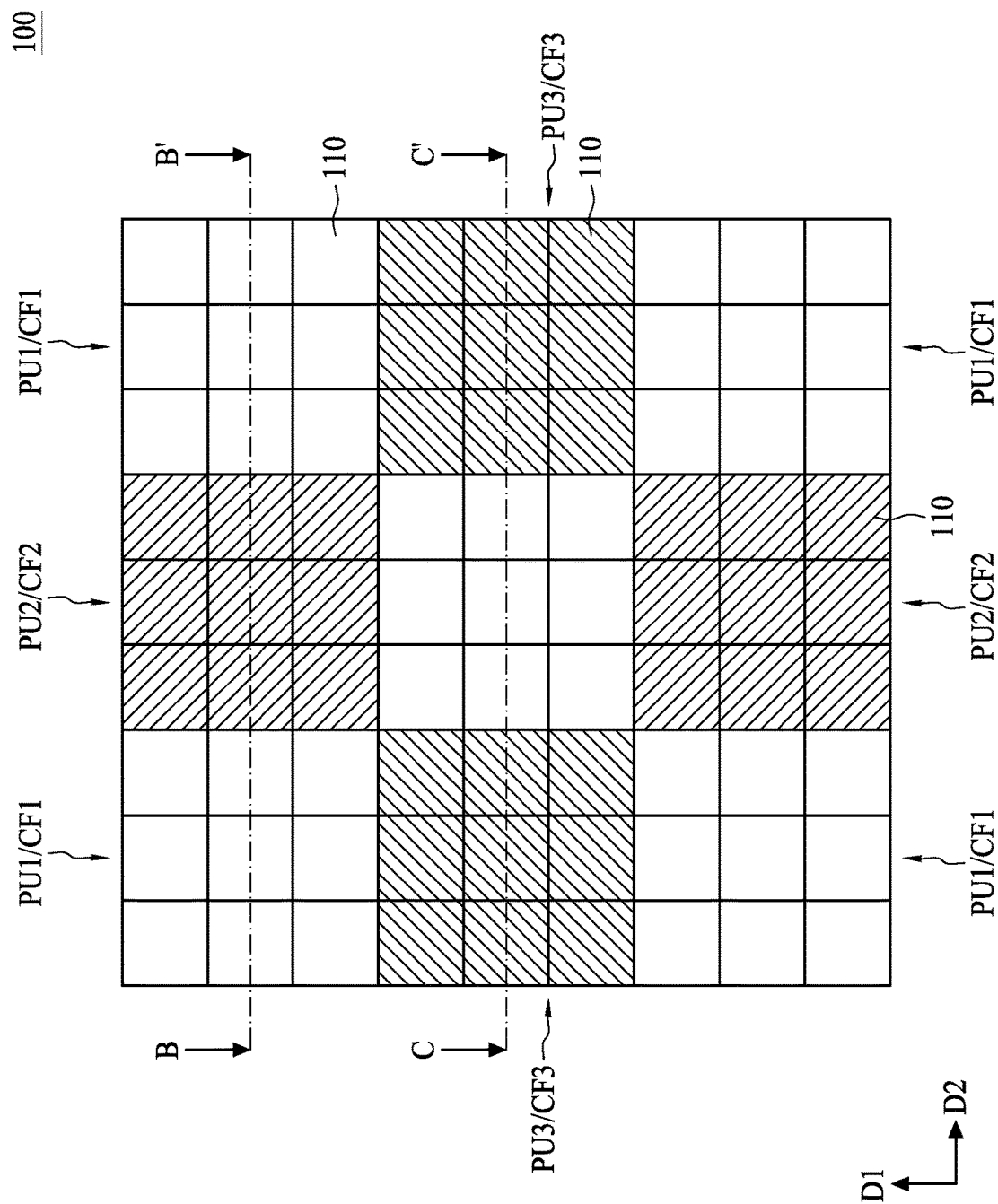
FIG. 1A is a schematic drawing illustrating a portion of an image sensor device according to aspects of the present disclosure in one embodiment.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, an "image" refers to a data generated from one single pixel which is covered by one single color filter.

As used herein, a "color channel" refers to a monochromatic unit in a mosaic pattern such as a Bayer pattern, which is inarguably the most widely used pattern for images sensors in digital cameras. Typically, the red and blue channels are surrounded vertically and horizontally by green channels in the Bayer pattern.

The elementary unit of the image sensor is defined as a pixel. Each pixel is characterized as an addressable area element with intensity and chroma attributes related to the spectral signal contrast derived from the photon collection efficiency of the micron-lens array. Image sensor devices utilize an array of pixels including photodiodes and transistors, to collect photo energy to convert images into electrical signals. However, image sensor devices suffer from "cross-talk": Incident light to one image sensor element may spread to its neighboring image sensor elements and generate photocharges, which is known is optical cross-talk. Or, photocharges generated in one image sensor element may diffuse into its neighboring image sensor elements, which is known as electrical or diffusion cross-talk. Cross-talk decreases color signal of affected channels and increases spectral overlap. Briefly speaking, cross-talk degrades spatial resolution, reduces overall optical sensitivity, and results in poor color separation.

Figure 1B:
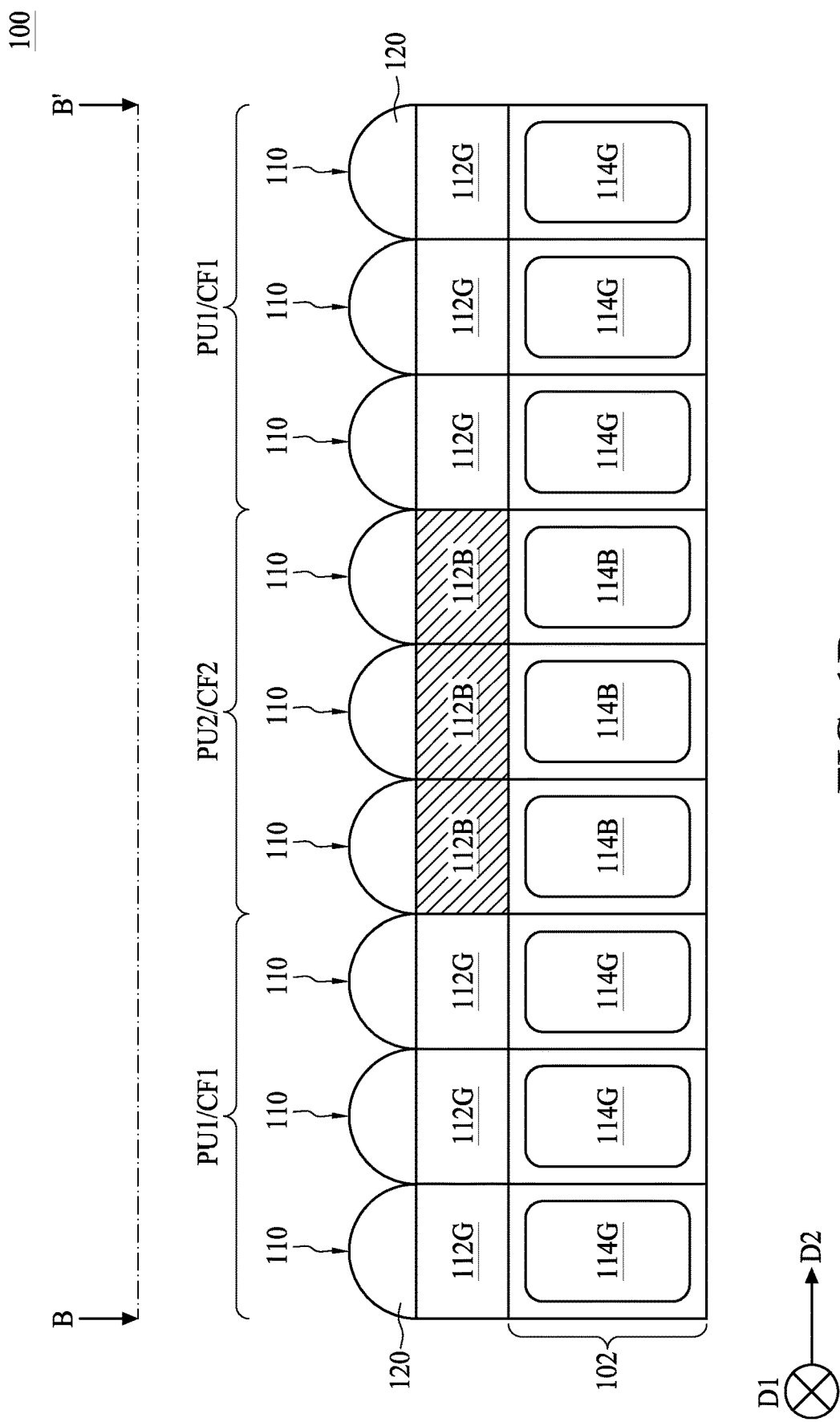
FIG. 1B is a cross-sectional view of the color filter array unit of FIG. 1A taken along a line B-B'.
Figure 1C:
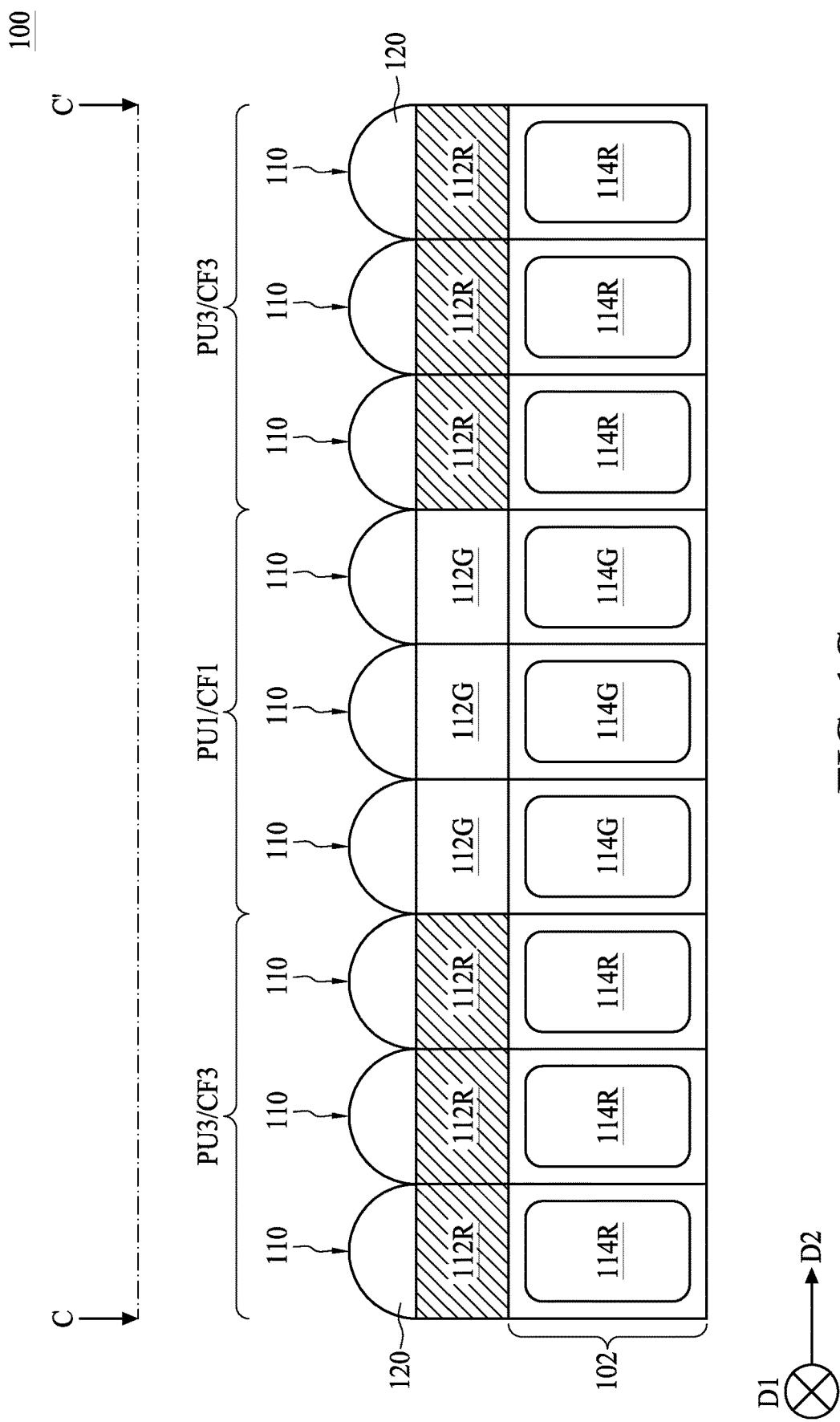
FIG. 1C is a cross-sectional view of the color filter array unit of FIG. 1A taken along a line C-C'

In the present disclosure, an image sensor device 100 is provided. Referring to FIGS. 1A-1C, a portion of the image sensor device 100 and its cross-sectional views are shown. The image sensor device 100 includes a semiconductor substrate 102 (shown in FIGS. 1B-1C). In some embodiments of the present disclosure, the semiconductor substrate 102 is a silicon substrate doped with a P-type dopant such as boron, in which case the semiconductor substrate 102 is a P-type substrate. Alternatively, the semiconductor substrate 102 could be another suitable semiconductor material. For example, the semiconductor substrate 102 may be a silicon substrate that is doped with an N-type dopant such as phosphorous or arsenic, in which case the semiconductor substrate 102 is an N-type substrate. In some embodiments of the present disclosure, the semiconductor substrate 102 may include other elementary semiconductors such as germanium. In some embodiments of the present disclosure, the semiconductor substrate 102 may optionally include a compound semiconductor and/or an alloy semiconductor. Further, the semiconductor substrate 102 may include an epitaxial layer (epi layer), may be strained for performance enhancement, and may include a silicon-on-insulator (SOI) structure.

The image sensor device 100 includes a plurality of pixel units arranged in an array. The plurality of pixel units include a plurality of first pixel units PU1, a plurality of second pixel units PU2 and a plurality of third pixel units PU3. As shown in FIG. 1A, the first pixel units PU1 and the second pixel units PU2 are alternately arranged in a longitudinal direction D1 and a latitudinal direction D2. The first pixel units PU1 and the third pixel units PU2 are alternately arranged in the longitudinal direction D1 and the latitudinal direction D2. The first pixel units PU1 are arranged in a first diagonal direction, and the second pixel units PU2 and the third pixel filter units PU3 are arranged in a second diagonal direction orthogonal to the first diagonal direction.

Each of the first pixel units PU1, each of the second pixel units PU2, and each of the third pixel units PU3 includes an array of n*m pixels 110, and n and m are integers equal to or greater than 3, as shown in FIGS. 1A-1C. In some embodiments of the present disclosure, each of the pixel units PU1, PU2 and PU3 can include an array of 3*3 pixels 110 as shown in FIG. 1A. In some embodiments of the present disclosure, each of the pixel units PU1, PU2 and PU3 can include an array of 4*4 pixels 110. Still in some embodiments of the present disclosure, each of the pixel units PU1, PU2 and PU3 can include an array of 4*3 or 3*4 pixels 110. It is concluded that n and m can be identical or different integers. The pixels 110 of the plurality of pixel units PU1/PU2/PU3 include the same shape and the same dimension. Also, any two adjacent pixels 110 of the plurality of pixel units PU1/PU2/PU3 are substantially equally spaced in the longitudinal direction D1 and in the latitudinal direction D2.

Referring to FIGS. 1A-1C, each of the pixels 110 of the first pixel units PU1 includes a first color filter 112G configured to pass light beams within a first wavelength range and a first photo sensing element 114G configured to sense the light beams passing through the first color filter 112G. Each of the pixels 110 of the second pixel units PU2 includes a second color filter 112B configured to pass light beams within a second wavelength range, and a second photo sensing element 114B configured to sense the light beams passing the through the second color filters 112B. And each of the pixels 110 of the third pixel units PU3 includes a third color filter 112R configured to pass light beams within a third wavelength range and a third photo sensing element 114R configured to sense the light beams passing through the third color filters 112R. It is concluded that a quantity of the pixels 110, a quantity of the color filters 112G/112B/112R, and a quantity of the photo sensing elements 114G/114B/114R are all the same. The first photo sensing elements 114G, the second photo sensing elements 114B, and the third photo sensing elements 114R are formed in the semiconductor substrate 102 to convert incoming light from light/image sources to electrical signals. In some embodiments of the present disclosure, the image sensor device 100 is a front-side illuminated (FSI) device. In some embodiments of the present disclosure, the image sensor device 100 is a back side illuminated image sensor (BSI) device, and the photo sensing elements 114G/114B/114R are operable to detect incoming lights from the back side of the semiconductor substrate 102 after the semiconductor substrate 102 is thinned down. The photo sensing elements 114G/114B/114R can include photodiodes, and the photodiodes are typically formed by multiple implant operations using various dopants, implant dosages, and implant energies. In some embodiment of the present disclosure, the photo sensing elements 114G/114B/114R may include pinned photodiode (PPD), photo-gates, reset transistors, source follower transistors, and transfer transistors.

In addition, although not illustrated for the sake of simplicity, isolation structures can be formed to separate the first photo sensing elements 114G, the second photo sensing elements 114B and the third photo sensing elements 114R from each other. Also not illustrated for the sake of simplicity, an interconnect structure can be formed over the semiconductor substrate 102 at the front side. The interconnect structure includes a plurality of patterned dielectric layers and conductive layers that provide interconnections between the various features, circuitry, and input/output of the image sensor device 100.

As mentioned above, each of the pixels 110 of the first pixel units PU1 includes the first color filter 112G configured to pass light beams within the first wavelength range, each of the pixels 110 of the second pixel units PU2 includes the second color filter 112B configured to pass light beams within the second wavelength range, and each of the pixels 110 of the third pixel units PU3 includes the third color filter 112R configured to pass light beams within the third wavelength range. In some embodiments of the present disclosure, the first wavelength range can be a wavelength range of green light, the second wavelength range can be a wavelength range of blue light, and the third wavelength range can be a wavelength range of red light. As shown in FIGS. 1B and 1C, each first color filter 112G projectively overlaps one first photo sensing element 114G, each second color filter 112B projectively overlaps one second photo sensing element 114B, and each third color filter 112R projectively overlaps one third photo sensing element 114R. Accordingly, it is referred to as that the image sensor device 100 includes a plurality of color filter units arranged in an array. The plurality of color filter units includes a plurality of first color filter units CF1, a plurality of second color filter units CF2 and a plurality of third color filter units CF3. Each of the first color filter units CF1 includes an array of n*m first color filters 112G, each of the second color filter units CF2 includes an array of n*m second color filters 112B, and each of the third color filter units CF3 includes an array of n*m third color filters 112R. N and m are integers equal to or greater than 3. Referring back to FIG. 1A, the first color filters 112G, the second color filers 112B and the third color filters 112R of the plurality of color filter units CF1/CF2/CF3 include the same shape and the same dimension. Furthermore, any two adjacent color filters 112G, 112B and 112R of the plurality of color filter units CF1/CF2/CF3 are substantially equally spaced in the longitudinal direction D1 and in the latitudinal direction D2.

Additionally, a passivation layer (not shown) and an anti-reflective layer (not shown) can be formed between the semiconductor substrate 102 and the color filters 112G/112B/112R. Furthermore, over the passivation and the anti-reflective layer, each pixel 110 of the first pixel units PU1, the second pixel units PU2 and the third pixel units PU3 includes a lens 120 as shown in FIGS. 1B and 1C.

As shown in FIG. 1A, the first color filter units CF1 and the second color filter units CF2 are alternately arranged in the longitudinal direction D1 and the latitudinal direction D2. The first color filter units CF1 and the third color filter units CF3 are alternately arranged in the longitudinal direction D1 and the latitudinal direction D2. The first color filter units CF1 are arranged in a first diagonal direction, and the second color filter units and the third color filter units are arranged in a second diagonal direction orthogonal to the first diagonal direction. In other words, the first color filter units CF1, the second color filter units CF2 and the third color filter units CF3 are arranged to form a Bayer pattern, unit-by-unit. As shown in FIG. 1A, the Bayer pattern measures the first color filter units CF1, that is the green color filter units, on a quincunx grid while the second and third color filter units CF2 and CF3, that are the blue and red color filter units, on rectangular grids. The green image is measured at a higher sampling rate because the peak sensitivity of the human visual system lies in the medium wavelengths, corresponding to the green portion of the spectrum.

Figure 2:
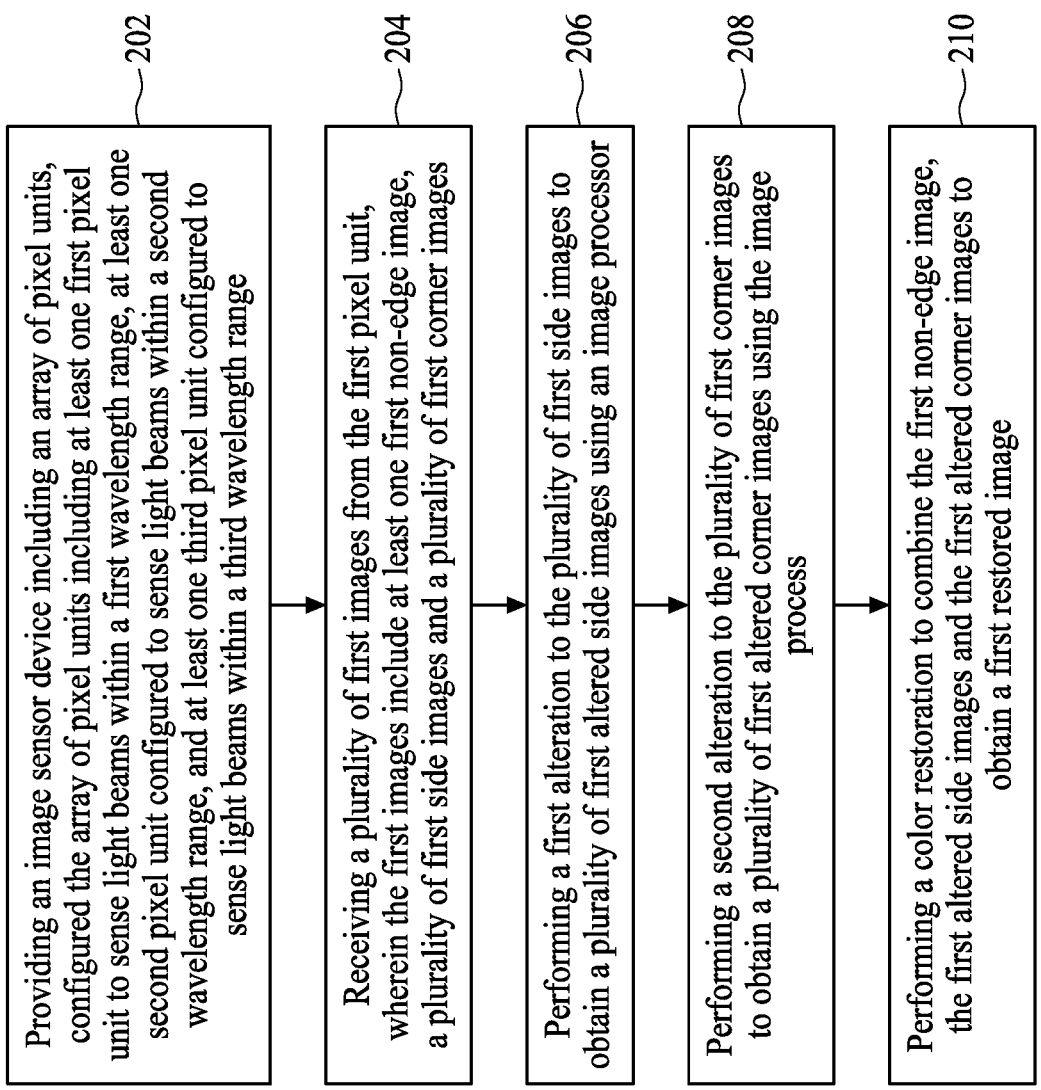
FIG. 2 is a flow chart representing an image processing method according to aspects of the present disclosure in one embodiment.

Referring to FIG. 2, which is a flow chart representing an image processing method 20 in accordance with some embodiments of the present disclosure, the image processing method 20 includes an operation 202, providing an image sensor device including an array of pixel units, the array of pixel units including at least one first pixel unit configured to sense light beams within a first wavelength range, at least one second pixel unit configured to sense light beams within a second wavelength range, and at least one third pixel unit configured to sense light beams within a third wavelength range. The image processing method 20 further includes an operation 204, receiving a plurality of first images from the first pixel unit, wherein the first images comprise at least one first non-edge image, a plurality of first side images and a plurality of first corner images. The image processing method 20 further includes an operation 206, performing a first alteration to the plurality of first side images to obtain a plurality of first altered side images using an image processor. The image processing method 20 further includes an operation 208, performing a second alteration to the plurality of first corner images to obtain a plurality of first altered corner images using the image process. The image processing method 20 further includes an operation 210, performing a color restoration to combine the first non-edge image, the first altered side images and the first altered corner images to obtain a first restored image. The image processing method 20 will be further described according to one or more embodiments.

Figure 3A:
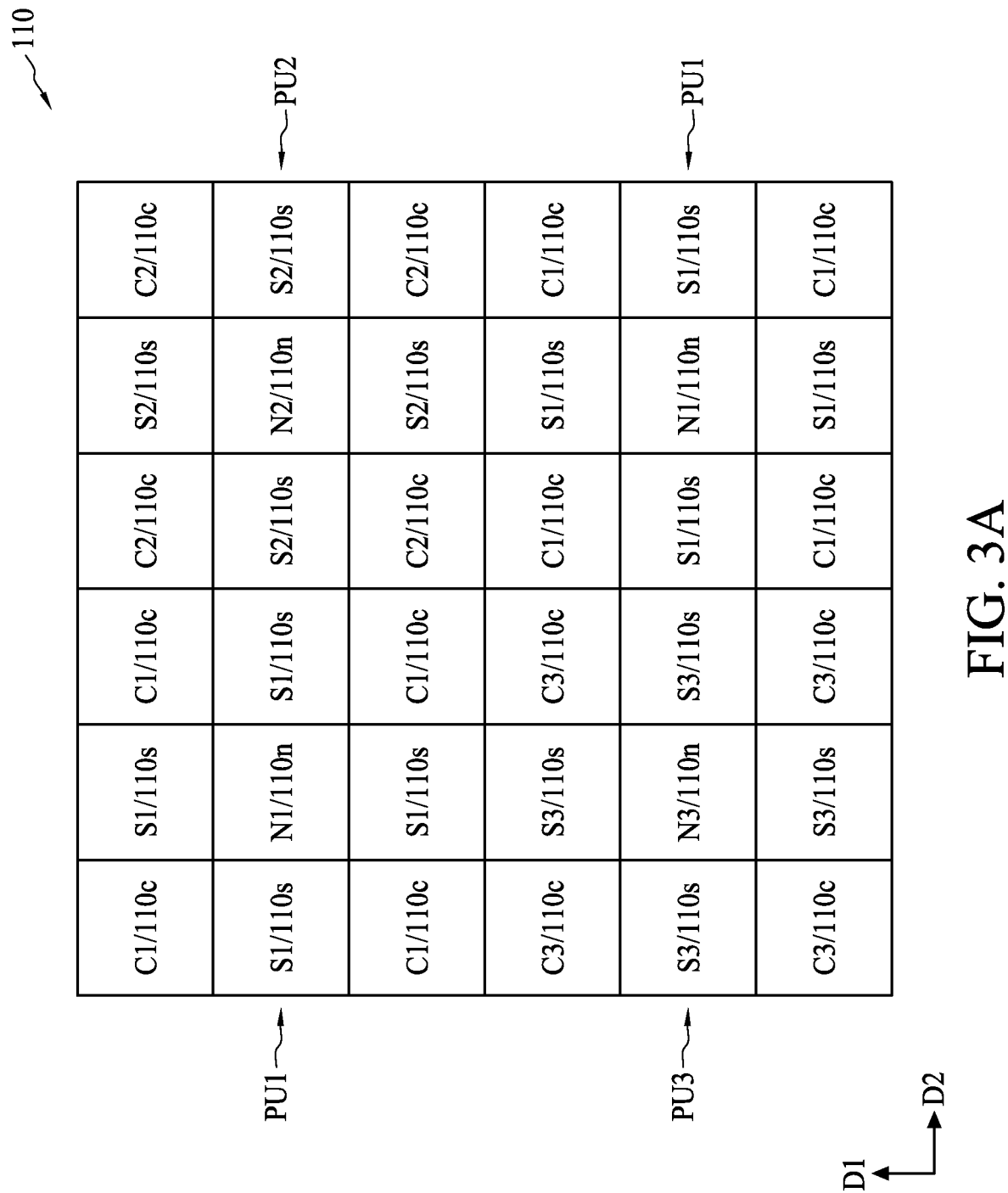
FIGS. 3A-3G are schematic drawings illustrating at various stages of the image processing method according to aspects of the present disclosure in one embodiment.

Referring to FIG. 3A-3E, which are schematic drawings illustrating at various stages of the image processing method 20 according to aspects of the present disclosure in one embodiment, the image sensor device 100 including the array of pixel units is provided according to operation 202. The array of pixel units including at least one pixel unit configured to sense light beams within the first wavelength range, at least one pixel unit configured to sense light beams within the second wavelength range, and at least one pixel unit configured to sense light beams within the third wavelength range. In some embodiments of the present disclosure, the pixel units configured to sense green light are taken as the first pixel units PU1, the pixel units configured to sense blue light are taken as the second pixel unit PU2, and the pixel units configured to sense red light are taken as the third pixel unit PU3. In some embodiments of the present disclosure, two first pixel units PU1, one second pixel unit PU2 and one third pixel unit PU3 are arranged to form a Bayer pattern unit as shown in FIG. 3A. As mentioned above, each of the pixel units PU1/PU2/PU3 includes the array of n*m pixels.

A plurality of first images is received from the first pixel unit PU1 according to operation 204. The first images include at least one first non-edge image N1, a plurality of first side images S1 and a plurality of first corner images C1. The at least one first non-edge image N1 is generated by at least one non-edge pixel 110n in the first pixel unit PU1. The plurality of first side images S1 is generated by a plurality of side pixels 110s adjacent to sides of the non-edge pixel 110n in the first pixel unit U1. And the plurality of first corner images C1 is generated by a plurality of corner pixels 110c adjacent to corners of the non-edge pixel 110n in the first pixel unit U1. Accordingly, one first color pixel unit PU1 generate n*m images including the same color, and the at least one first non-edge image N1 is generated from the at least one non-edge pixel 110n, which is completely surrounded by the pixels 110s/110c.

A plurality of second images is received from the second pixel unit PU2. The second images include at least one second non-edge image N2, a plurality of second side images S2, and a plurality of second corner images C2. The at least one second non-edge image N2 is generated by at least one non-edge pixel 110n in the second pixel unit PU2. The plurality of second side images S2 is generated by a plurality of side pixels 110s adjacent to sides of the non-edge pixel 110n in the second pixel unit PU2. And the plurality of second corner images C2 is generated by a plurality of corner pixels 110c adjacent to corners of the non-edge pixel 110n in the second pixel unit PU2. Accordingly, one second color pixel unit PU2 generate n*m images including the same color, and at least one second non-edge image N2 is generated from the at least one non-edge pixel 110n, which is completely surrounded by the pixels 110s/110c.

A plurality of third images is received from the third pixel unit PU3. The third images include at least one third non-edge image N3, a plurality of third side images S3, and a plurality of third corner images C3. The at least one third non-edge image N3 is generated by at least one non-edge pixel 110n in the third pixel unit PU3. The plurality of third side images S3 is generated by a plurality of side pixels 110s adjacent to sides of the non-edge pixel 110n in the third pixel unit PU3. And the plurality of third corner images C3 is generated by a plurality of corner pixels 110c adjacent to corners of the non-edge pixel 110n in the third pixel unit PU3. Accordingly, one third color pixel unit PU3 generate n*m images including the same color, and the at least one third non-edge image N3 is generated from the at least one non-edge pixel 110n, which is completely surrounded by the pixels 110s/110c.

Figure 3B:
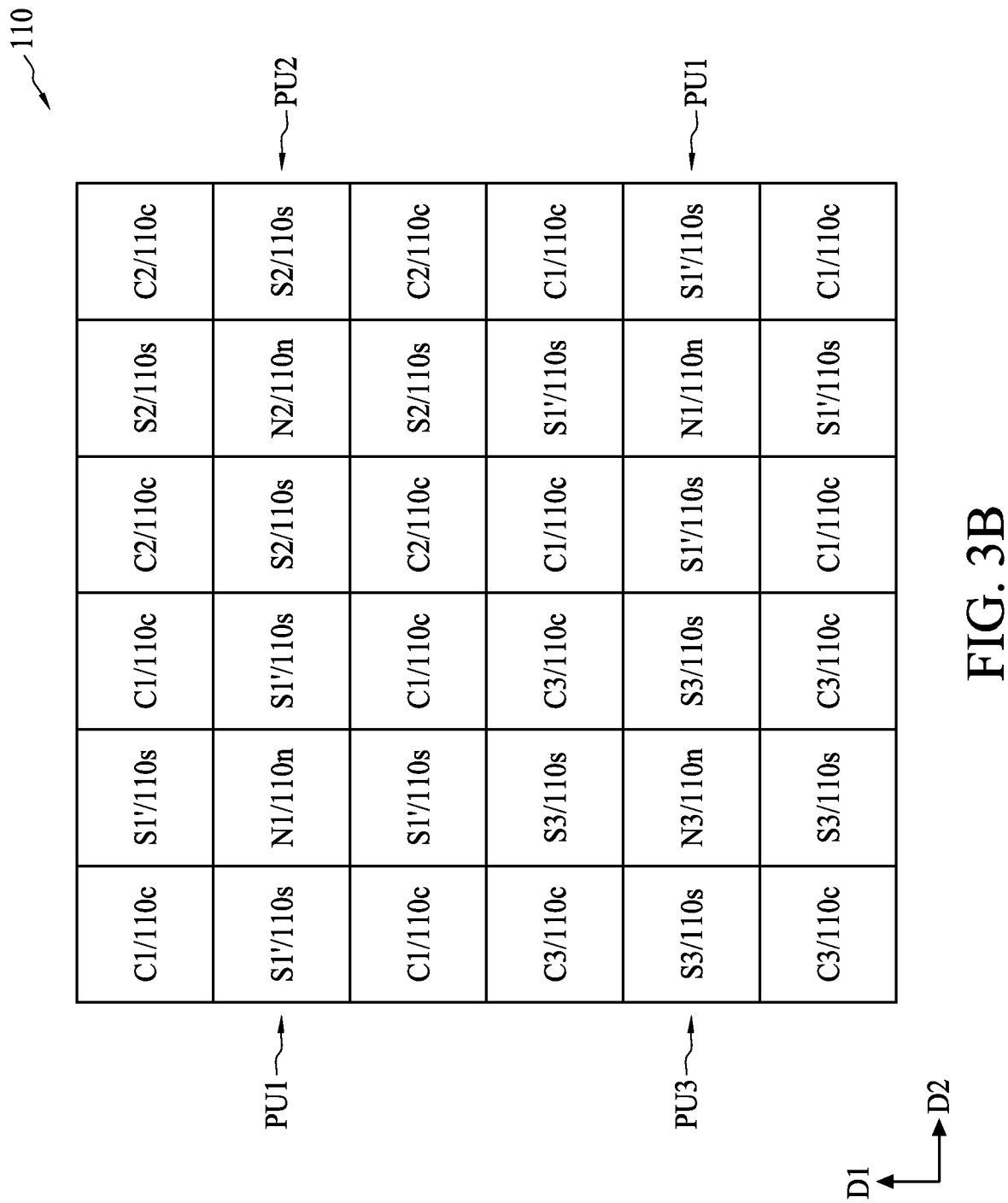

Referring to FIGS. 3A and 3B, next, a first alteration is performed to the plurality of first side images S1 to obtain a plurality of first altered side images S1' using an image processor according to operation 206. In some embodiments of the present disclosure, the first alteration can be performed according to equation (1) or, alternatively, equation (2):

$$S1'=f(S1,S2,N2,N1) \qquad (1)$$

$$S1'=f(S1,S3,N3,N1) \qquad (2)$$

Accordingly, S1' is referred to the first altered side image, S1 is referred to the first side image, N1 is referred to the first non-edge image, S2 is referred to the second side image, N2 is referred to the second non-edge image, S3 is referred to the third side image, and N3 is referred to the third non-edge image.

It should be noted that in the first pixel unit PU1, the first non-edge image N1 is impervious to the cross-talk because it is generated by the non-edge pixel 110n which is surrounded by other pixels 110s/110n of the same color. Different from the first non-edge image N1, the first side image S1 suffers cross-talk because the first side pixels 110s are adjacent to other side pixel 110s of the second pixel unit PU2 or the third pixel unit PU3. Therefore the first alteration concerning the first side image S1, the second side image S2, the first non-edge image N1, and the second non-edge image N2, or the first alteration concerning the first side image S1, the third side image S3, the first non-edge image N1, and the third non-edge image N3 is performed. Furthermore, other image signals such as the first corner images C1 and the second corner images C2 can be used if required.

In some embodiments of the present disclosure, the first alteration can be performed according to equation (3) or, alternatively, equation (4)

$$S1'=S1-g(S2,N2)+h(N1) \quad (3)$$

$$S1'=S1-g(S3,N3)+h(N1) \quad (4)$$

As mentioned above, in the first pixel unit PU1, the first non-edge image N1 is impervious to the cross-talk because it is generated by the non-edge pixel 110$n$ which is surrounded by other pixels 110$s$/110$n$ of the same color. Different from the first non-edge image N1, the first side image S1 suffers cross-talk because the first side pixels 110$s$ are adjacent to other side pixel 110$s$ of the second pixel unit PU2 or the third pixel unit PU3. The second pixel unit PU2 generates the second side image S2 and the third pixel unit PU3 generates the third side image S3 including colors different from the first side image S1. Therefore, the first alteration is performed to reduce signals of the second side image S2 or the third side image S3 in the first side image S1. In some embodiments of the present disclosure, when the first side image S1 is generated by the side pixel 110$s$ adjacent to the second pixel units PU2, the first alteration is performed according to equation (3). And when the first side image S1 is generated by the side pixel 110$s$ adjacent to the third pixel units PU3, the first alteration is performed according to equation (4). Consequently, cross-talk from the second pixel unit PU2 or the third pixel unit PU3 are reduced, and the altered side image S1' is therefore closer to the true color according to operation 206.

Additionally, in some embodiments of the present disclosure, the image processing method 20 can be temporarily held at operation 206 in a waiting function. In some embodiments of the present disclosure, non-linear functions can be adopted. Accordingly, the altered first side image S1' can be obtained by performing an alteration concerning the first corner images C1 and the second corner images C2 or concerning the first corner images C1 and the third corner images C3. In some embodiments of the present disclosure, both linear functions and non-linear functions can be adopted. Accordingly, the altered first side images S1' can be obtained by performing an alteration concerning the first side image S1, the second side image S2 (or the third side image S3), the first non-edge image N1, the second non-edge image N2 (or the third non-edge image N3), the first corner images C1, and the second corner images C2 (or the third corner images C3).

Figure 3C:
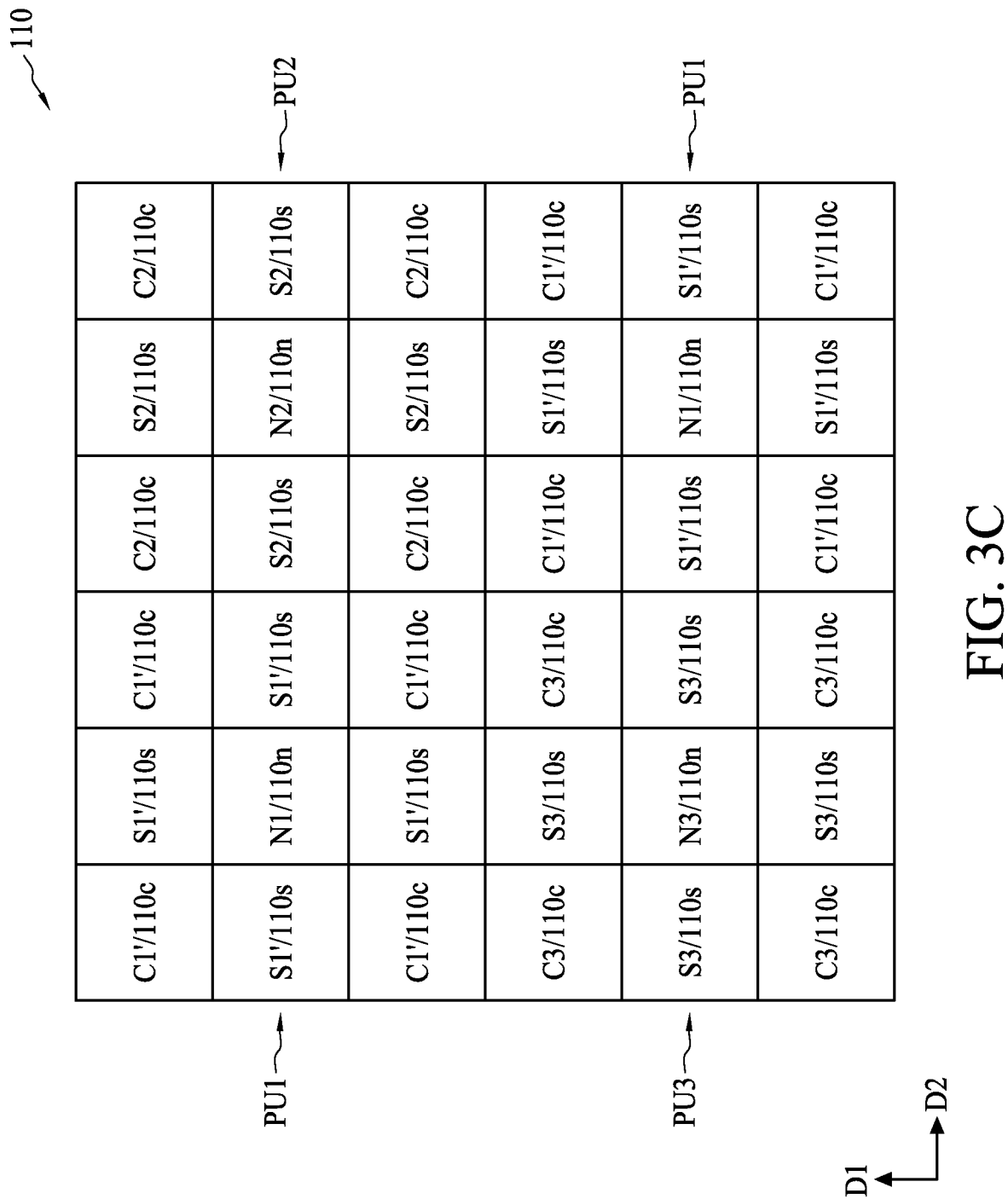

Referring to FIG. 3A and FIG. 3C. A second alteration is performed to the plurality of first corner images C1 to obtain a plurality of first altered corner images C1' using the image processor according to operation 208. In some embodiments of the present disclosure, the second alteration can be performed according to equation (5):

$$C1'=C1-f(C2,N2)-g(C3,N3)+h(N1) \quad (5)$$

Accordingly, C1' is referred to the first altered corner image, C1 is referred to first corner image, N1 is referred to first the non-edge image, C2 is referred to the second corner image, N2 is referred to the second non-edge image, C3 is referred to the third corner image, and N3 is referred to the third non-edge image.

As mentioned above, the first non-edge image N1 is impervious to the cross-talk because it is generated by the non-edge pixel 110$n$ which is surrounded by other pixels 110$s$/110$n$ of the same color. Different from the first non-edge image N1, the first corner image C1 suffers cross-talk because the corner pixels 110$c$ are adjacent to other corner pixels 110$s$ of the second pixel unit PU2 and the third pixel unit PU3. The second pixel unit PU2 generates the second corner image C2 and the third pixel unit PU3 generates the third corner image C3. And both of the second corner image C2 and the third corner images C3 include colors different from the first corner image C1. Therefore, the second alteration is performed to reduce signals of the second corner image C2 and the third corner image C3 in the first corner image C1 according to equation (3). Consequently, cross-talk from the second pixel unit PU2 and the third pixel unit PU3 are reduced and the altered corner image C1' is therefore closer to the true color according to operation 208.

In some embodiments of the present disclosure, operation 206 and operation 208 can be simultaneously performed. In some embodiments of the present disclosure, operation 206 and operation 208 can be sequentially performed.

Figure 3D:
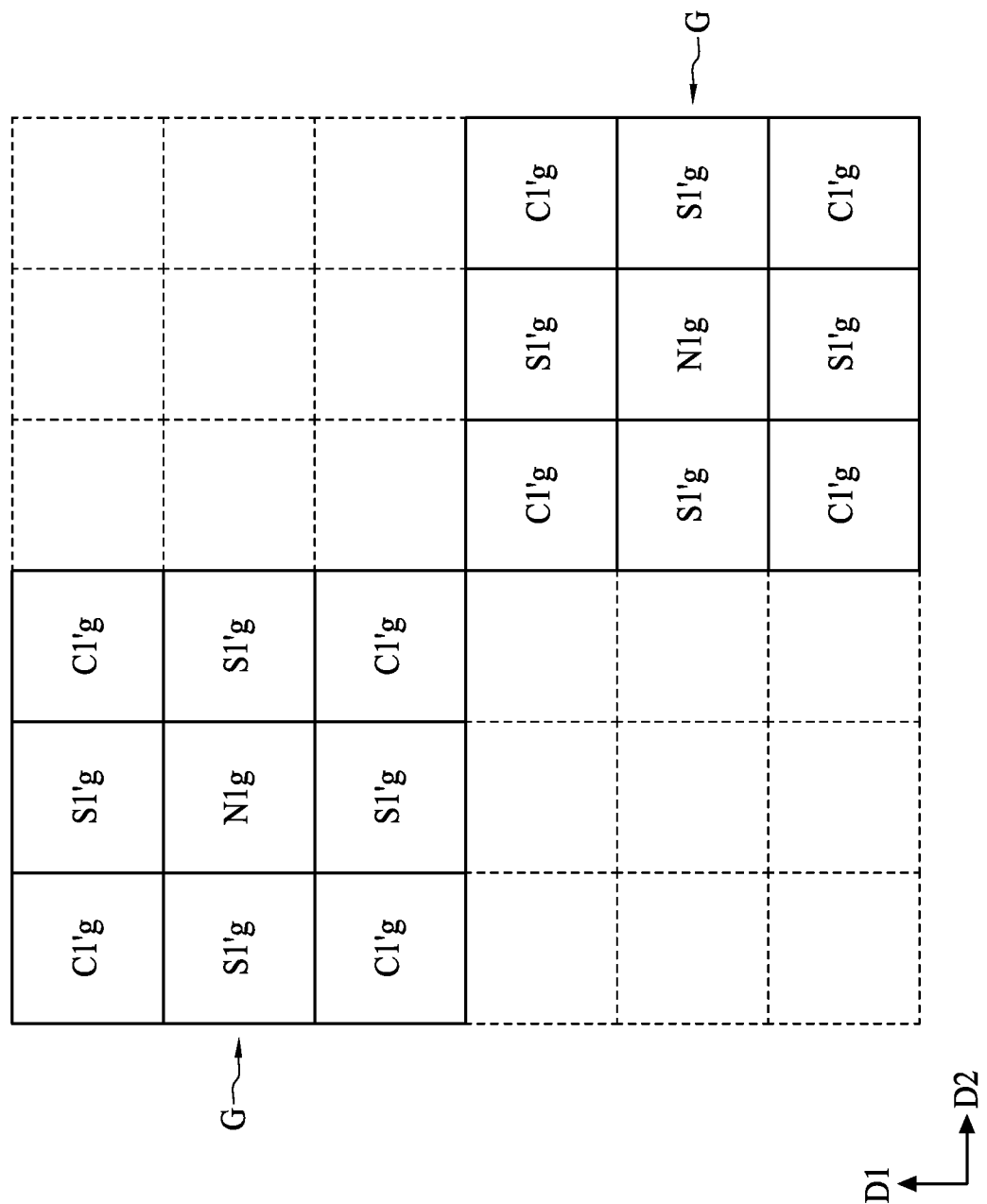
Figure 3E:
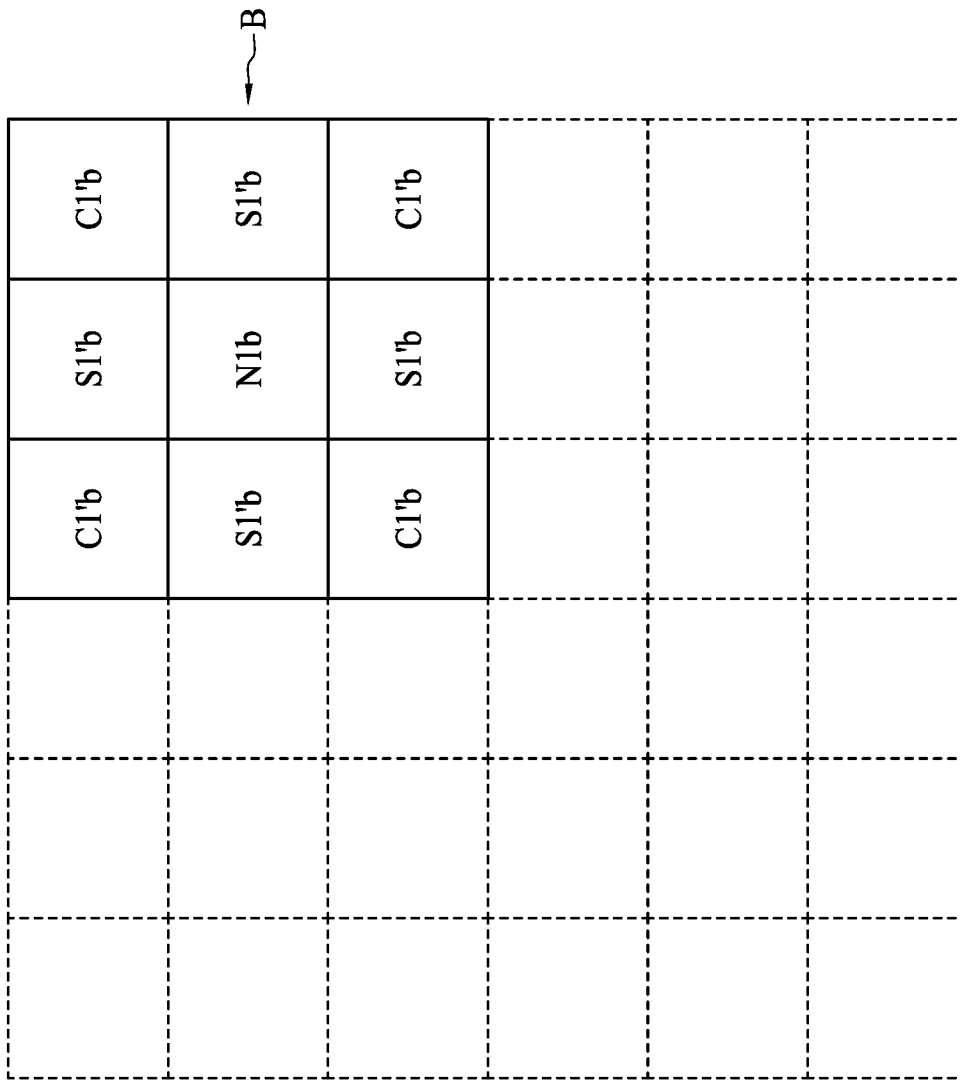
Figure 3F:
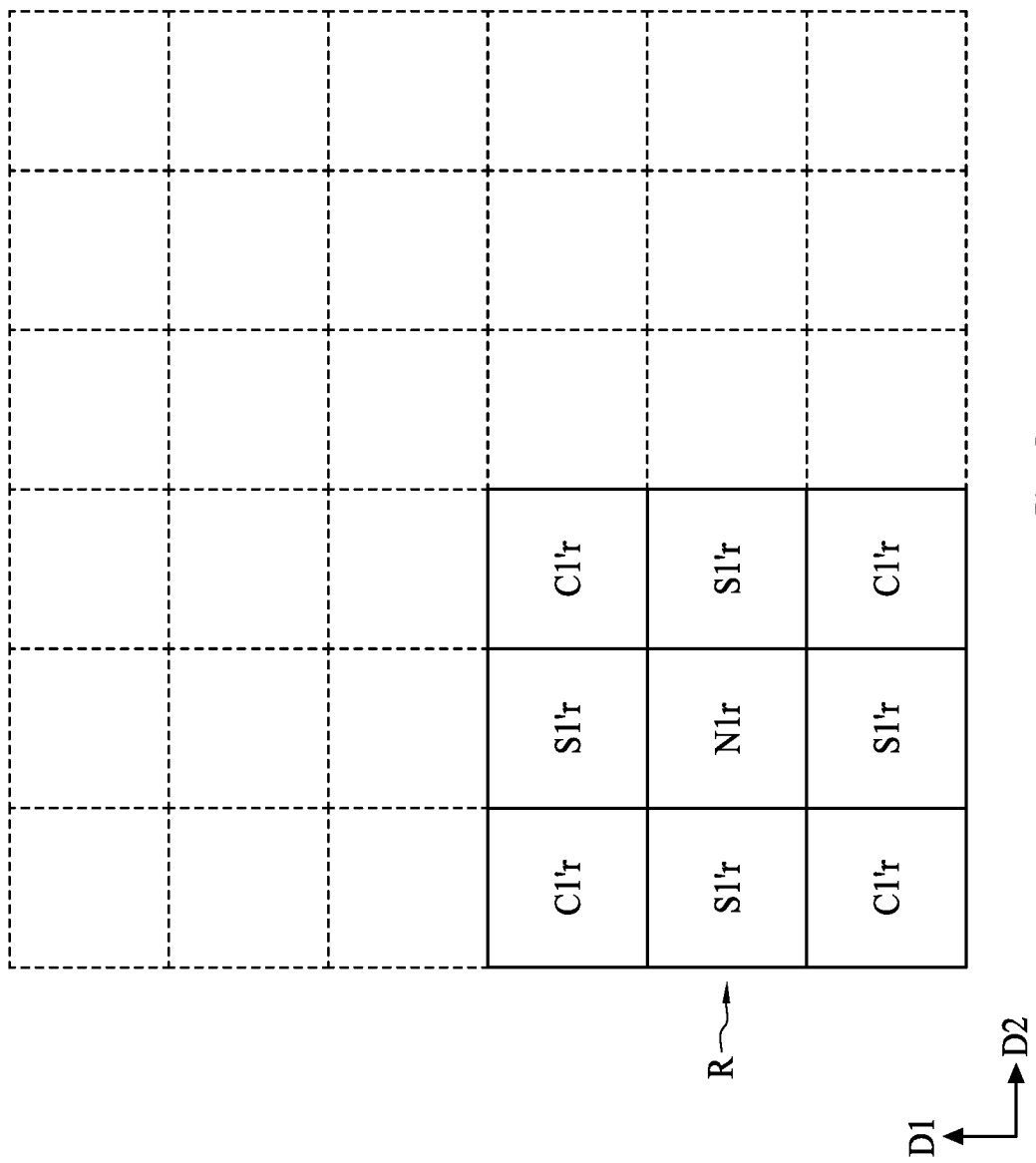

Referring to FIG. 3D, according to some embodiments of the present disclosure, the green pixel units are taken as the first pixel units PU1, and the image processing method 20 is performed to obtain m*n green images including the at least one non-edge image N1$g$, the plurality of altered side images S1'$g$ and the plurality of altered corner images C1'$g$ in single exposure. The m*n green images are restored or combined to form one green channel "G" according to operation 210 as shown in FIG. 3D. Referring to FIG. 3E, the blue pixel units can be taken as the first pixel units PU1, and the image processing method 20 is performed to obtain m*n blue images including the at least one non-edge image N1$b$, the plurality of altered side images S1'$b$ and the plurality of altered corner images C1'$b$ in single exposure. The m*n blue images are restored or combined to form one blue channel "B" according to operation 210 as shown in FIG. 3E. Referring to FIG. 3F, the red pixel units can also be taken as the first pixel units PU1, and the image processing method 20 is performed to obtain m*n red images including the at least one non-edge image N1$r$, the plurality of altered side images S1'$r$ and the plurality of altered corner images C1'$r$ in single exposure. The m*n red images are restored or combined to form one red channel "R" according to operation 210 as shown in FIG. 3F. In other words, each color channel G/B/R includes n*m images. Accordingly, 3*n*m images are obtained at single exposure in accordance with some embodiments of the present disclosure as shown in FIGS. 3D-3F.

Figure 3G:

Referring to FIG. 3G, the m*n images, which are depicted by the dotted lines, are restored to form color channel G, B or R as mentioned above. And the color channels G/B/R are arranged to form a mosaic pattern as shown in FIG. 3G. Subsequently, color demosaicking can be performed to produce full color image. For example, missing color channels are interpolated. In some embodiments of the present disclosure, the simples demosaicking operation such as linear interpolation is applied to every channel. It should be understood that more sophisticated demosaicking methods such as bilinear or edge-directed interpolation have been reported, which have the accuracy higher than linear interpolation can be involved. Furthermore, the resolution of an image sensor device 100 can be further improved by a digital image processing algorithm such as super-resolution reconstruction. In some embodiment of the present disclosure, the demosaicking methods and the super resolution reconstructions can be performed simultaneously. In some embodiments of the present disclosure, the demosaicking methods and the super resolution reconstructions can be performed sequentially.

In some embodiments of the present disclosure, super-resolution generally increases image resolution without necessitating a change in the design of the optics and/or detectors by using a sequence (or a few snapshots) of low-resolution images. Super-resolution algorithms effectively de-alias undersampled images to obtain a substantially alias-free or, as identified in the literature, a super-resolved image.

In the present disclosure, each pixel unit includes the at least non-edge pixel, the plurality of side pixels and the plurality of corner pixels. Furthermore, the non-edge image is generated by the at least one non-edge pixel, the side images are generated by the plurality of side pixels, and the corner images are generated by the plurality of corner pixels at single exposure. The non-edge image is found impervious to cross-talk because it is generated by the non-edge pixel, and thus no alteration is performed to the non-edge image. Furthermore, different alterations are performed to the side images and the corner images to reduce cross-talk, and thus altered side images and altered corner image that are closer to the true color are obtained. The n*m image including the non-edge image, the altered side images and the altered corner images are restored to form one color channel that is closer to true color. Subsequently, image processing such as demosaicking and super resolution algorithm can be performed to reconstruct the full-colored and super resolution pictures. Additionally, since the images are taken in single exposure, super-resolution on moving object can be ignored. Furthermore, no frame-memory is needed and thus less computational resource is required.

In some embodiments, an image sensor device is provided. The image sensor device includes a plurality of color filter units arranged in an array, each of the color filter units comprising an array of n*m color filters, and n and m are integers equal to or greater than 3. The plurality of color filter units includes a plurality of first color filter units, a plurality of second color filter units, and a plurality of third color filter units. The color filters of the first color filter units are transmissive to light beams within a first wavelength range; the color filters of the second color filter units are transmissive to light beams within a second wavelength range, and the color filters of the third color filter units are transmissive to light beams within a third wavelength range.

In some embodiments, an image sensor device is provided. The image sensor device includes a plurality of pixel units arranged in an array, each of the pixel units includes an array of n*m pixels, and n and m are integers equal to or greater than 3. The plurality of pixel units include a plurality of first pixel units, a plurality of second pixel units, and a plurality of third pixel units. Each of the pixels of the first pixel units includes a first color filter configured to pass light beams within a first wavelength range and a first photo sensing element configured to sense the light beams passing through the first color filter. Each of the pixels of the second pixel units comprises a second color filter configured to pass light beams within a second wavelength range, and a second photo sensing element configured to sense the light beams passing the through the second color filters. And each of the pixels of the third pixel units comprises a third color filter configured to pass light beams within a third wavelength range and a third photo sensing element configured to sense the light beams passing through the third color filters.

In some embodiments, an image processing method is provided. The image processing method includes providing an image sensor device comprising an array of pixel units, the array of pixel units comprising at least one first pixel unit configured to sense light beams within a first wavelength range, at least one second pixel unit configured to sense light beams within a second wavelength range, and at least one third pixel unit configured to sense light beams within a third wavelength range; receiving a plurality of first images from the first pixel unit, wherein the first images comprise at least one first non-edge image, a plurality of first side images and a plurality of first corner images; performing a first alteration to the plurality of first side images to obtain a plurality of first altered side images using an image processor; performing a second alteration to the plurality of first corner images to obtain a plurality of first altered corner images using the image process; and performing a color restoration to combine the first non-edge image, the first altered side images and the first altered corner images.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image processing method, comprising:
   providing an image sensor device comprising an array of pixel units, the array of pixel units comprising at least one first pixel unit configured to sense light beams within a first wavelength range, at least one second pixel unit configured to sense light beams within a second wavelength range, and at least one third pixel unit configured to sense light beams within a third wavelength range;
   receiving a plurality of first images from the first pixel unit, wherein the first images comprise at least one first non-edge image, a plurality of first side images and a plurality of first corner images;
   performing a first alteration to the plurality of first side images to obtain a plurality of first altered side images using an image processor;
   performing a second alteration to the plurality of first corner images to obtain a plurality of first altered corner images using the image processor; and
   performing a color restoration to combine the first non-edge image, the first altered side images and the first altered corner images,
   wherein each of the first pixel unit, the second pixel unit and the third pixel unit comprises an array of n*m pixels, each pixel comprises a color filter and a lens, and an amount of the color filters and an amount of the lenses are the same.

2. The image processing method of claim 1, further comprising receiving a plurality of second images from the second pixel unit, wherein the second images comprise at least one second non-edge image, a plurality of second side images, and a plurality of second corner images, wherein the first alteration is performed according to equation (1) or, alternatively, equation (2):

$$S1'=f(S1,S2,N2,N1) \qquad (1)$$

$$S1'=f(S1,S3,N3,N1) \qquad (2)$$

wherein S1' is referred to the first altered side image, S1 is referred to the first side image, N1 is referred to the first non-edge image, S2 is referred to the second side image, N2 is referred to the second non-edge image, S3 is referred to the third side image, and N3 is referred to the third non-edge image.

3. The image processing method of claim 2, further comprising receiving a plurality of second images from the second pixel unit, wherein the second images comprise at least one second non-edge image, a plurality of second side images, and a plurality of second corner images, wherein the first alteration is performed according to equation (3) or, alternatively, equation (4):

$$S1'=S1-g(S2,N2)+h(N1) \qquad (3)$$

$$S1'=S1-g(S3,N3)+h(N1) \qquad (4)$$

wherein S1' is referred to the first altered side image, S1 is referred to the first side image, N1 is referred to the first non-edge image, S2 is referred to the second side image, N2 is referred to the second non-edge image, S3 is referred to the third side image, and N3 is referred to the third non-edge image.

4. The image processing method of claim 2, further comprising receiving a plurality of third images from the third pixel unit, wherein the third images comprise at least one third non-edge image, a plurality of third side images, and a plurality of third corner images, wherein the second alteration is performed according to equation (5):

$$C1'=C1-f(C2,N2)-g(C3,N3)+h(N1) \qquad (5)$$

wherein C1' is referred to the first altered corner image, C1 is referred to first corner image, N1 is referred to first the non-edge image, C2 is referred to the second corner image, N2 is referred to the second non-edge image, C3 is referred to the third corner image, and N3 is referred to the third none-edge image.

5. The image processing method of claim 1, wherein in the array of n*m pixels, n and m are integers equal to or greater than 3.

6. The image processing method of claim 5, wherein the pixels in the first pixel unit comprise a at least one first non-edge pixel configured to generate the first non-edge image, a plurality of first side pixels adjacent to the first non-edge pixel and configured to generate the plurality of first side images, and a plurality of first corner pixels adjacent to corners of the first non-edge pixel and configured to generate the plurality of first corner images.

7. The image processing method of claim 5, wherein the pixels in the first pixel unit comprise the same shape and the same dimension, and any two adjacent first pixels are substantially equally spaced in a longitudinal direction and in a latitudinal direction.

8. The image processing method of claim 1, wherein color filters comprising an array of n*m color filters.

9. An image processing method, comprising:
providing a first pixel unit configured to sense light beams within a first wavelength range, wherein the first pixel unit comprises an array of n*m pixels, each pixel comprises a color filter and a lens, and an amount of the color filters and an amount of the lenses are the same;
receiving a first non-edge image, a plurality of first side images and a plurality of first corner images from the first pixel unit;
performing a first alteration to the first side images to obtain a plurality of first altered side images using an image processor;
performing a second alteration to the first corner images to obtain a plurality of first altered corner images using the image processor; and
performing a color restoration to combine the first non-edge image, the first altered side images and the first altered corner images.

10. The image processing method of claim 9, further comprises:
a second pixel unit configured to sense light beams within a second wavelength range different from the first wavelength range; and
a third pixel unit configured to sense light beams within a third wavelength range different from the first wavelength range and the second wavelength range.

11. The image processing method claim 10, further comprising:
receiving a second non-edge image, a plurality of second side images, and a plurality of second corner images from the second pixel unit; and
receiving a third non-edge image, a plurality of third side images, and a plurality of third corner images from the third pixel unit.

12. The image processing method of claim 11, wherein the first alteration is performed according to equation (1) or, alternatively, equation (2):

$$S1'=f(S1,S2,N2,N1) \qquad (1)$$

$$S1'=f(S1,S3,N3,N1) \qquad (2)$$

wherein S1' is referred to the first altered side image, S1 is referred to the first side image, N1 is referred to the first non-edge image, S2 is referred to the second side image, N2 is referred to the second non-edge image, S3 is referred to the third side image, and N3 is referred to the third non-edge image.

13. The image processing method of claim 11, wherein the first alteration is performed according to equation (3) or, alternatively, equation (4):

$$S1'=S1-g(S2,N2)+h(N1) \qquad (3)$$

$$S1'=S1-g(S3,N3)+h(N1) \qquad (4)$$

wherein S1' is referred to the first altered side image, S1 is referred to the first side image, N1 is referred to the first non-edge image, S2 is referred to the second side image, N2 is referred to the second non-edge image, S3 is referred to the third side image, and N3 is referred to the third non-edge image.

14. The image processing method of claim 11, wherein the second alteration is performed according to equation (5):

$$C1'=C1-f(C2,N2)-g(C3,N3)+h(N1) \qquad (5)$$

wherein C1' is referred to the first altered corner image, C1 is referred to first corner image, N1 is referred to first the non-edge image, C2 is referred to the second corner image, N2 is referred to the second non-edge image, C3 is referred to the third corner image, and N3 is referred to the third none-edge image.

15. The image processing method of claim 9, wherein in the array of n*m pixels, n and m are integers equal to or greater than 3.

16. The image processing method of claim 9, wherein the pixels in the first pixel unit comprise the same shape and the same dimension, and any two adjacent first pixels are substantially equally spaced in a longitudinal direction and in a latitudinal direction.

17. An image processing method, comprising:
providing an image sensor device comprising a first pixel unit configured to sense light beams within a first wavelength range, a second pixel unit configured to sense light beams within a second wavelength range, and a third pixel unit configured to o sense light beams within a third wavelength range, wherein each of the first pixel unit, the second pixel unit and the third pixel unit comprises an array of n*m pixels, each pixel comprises a color filter and a lens, and an amount of the color filters and an amount of the lenses are the same;
receiving a first non-edge image, a plurality of first side images and a plurality of first corner images from the first pixel unit, receiving a second non-edge image, a plurality of second side images and a plurality of second corner images from the second pixel unit, and receiving a third non-edge image, a plurality of third side images and a plurality of third corner images from the third pixel unit;
performing a first alteration to the first side images to obtain a plurality of first altered side images using an image processor;
performing a second alteration to the first corner images to obtain a plurality of first altered corner images using the image processor; and
performing a color restoration to combine the first non-edge image, the first altered side images and the first altered corner images.

18. The image processing method of claim 17, wherein the first alteration is performed according to equation (1) or, alternatively, equation (2):

$$S1'=f(S1,S2,N2,N1) \tag{1}$$

$$S1'=f(S1,S3,N3,N1) \tag{2}$$

wherein S1' is referred to the first altered side image, S1 is referred to the first side image, N1 is referred to the first non-edge image, S2 is referred to the second side image, N2 is referred to the second non-edge image, S3 is referred to the third side image, and N3 is referred to the third non-edge image.

19. The image processing method of claim 17, wherein the first alteration is performed according to equation (3) or, alternatively, equation (4):

$$S1'=S1-g(S2,N2)+h(N1) \tag{3}$$

$$S1'=S1-g(S3,N3)+h(N1) \tag{4}$$

wherein S1' is referred to the first altered side image, S1 is referred to the first side image, N1 is referred to the first non-edge image, S2 is referred to the second side image, N2 is referred to the second non-edge image, S3 is referred to the third side image, and N3 is referred to the third non-edge image.

20. The image processing method of claim 17, wherein the second alteration is performed according to equation (5):

$$C1'=C1-f(C2,N2)-g(C3,N3)+h(N1) \tag{5}$$

wherein C1' is referred to the first altered corner image, C1 is referred to first corner image, N1 is referred to first the non-edge image, C2 is referred to the second corner image, N2 is referred to the second non-edge image, C3 is referred to the third corner image, and N3 is referred to the third none-edge image.

* * * * *